United States Patent

Hori

(10) Patent No.: US 9,179,034 B2
(45) Date of Patent: Nov. 3, 2015

(54) INFORMATION PROCESSING SYSTEM AND INFORMATION PROCESSING METHOD FOR DISTRIBUTING JOB DATA AMONG PLURALITY OF FIRST INFORMATION PROCESSING DEVICES

(71) Applicant: Seijiro Hori, Tokyo (JP)

(72) Inventor: Seijiro Hori, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/590,092

(22) Filed: Jan. 6, 2015

(65) Prior Publication Data

US 2015/0201107 A1  Jul. 16, 2015

(30) Foreign Application Priority Data

Jan. 14, 2014  (JP) ................................. 2014-004091

(51) Int. Cl.
| | |
|---|---|
| H04N 1/327 | (2006.01) |
| H04N 1/00 | (2006.01) |
| H04N 1/32 | (2006.01) |
| H04N 1/21 | (2006.01) |

(52) U.S. Cl.
CPC ....... H04N 1/32771 (2013.01); H04N 1/00244 (2013.01); H04N 1/21 (2013.01); H04N 1/32523 (2013.01); H04N 2201/0032 (2013.01); H04N 2201/0094 (2013.01)

(58) Field of Classification Search
CPC . H04N 1/32771; H04N 1/21; H04N 1/00244; H04N 1/32523; H04N 2201/0094; H04N 2201/0032; H04N 1/0023; H04N 1/32545

USPC ........................................................ 358/1.15
See application file for complete search history.

(56) References Cited

U.S. PATENT DOCUMENTS

| | | | | |
|---|---|---|---|---|
| 5,930,465 | A  * | 7/1999 | Bellucco et al. | 358/1.15 |
| 2006/0007482 | A1 * | 1/2006 | Nakahashi | 358/1.15 |
| 2006/0192997 | A1 * | 8/2006 | Matsumoto et al. | 358/1.15 |
| 2010/0036905 | A1 * | 2/2010 | Shima | 709/203 |
| 2013/0208302 | A1 * | 8/2013 | Tanaka et al. | 358/1.15 |

FOREIGN PATENT DOCUMENTS

| | | |
|---|---|---|
| JP | 2001-202463 | 7/2001 |
| JP | 2011-081741 | 4/2011 |

\* cited by examiner

*Primary Examiner* — Benny Q Tieu
*Assistant Examiner* — Quyen V Ngo
(74) *Attorney, Agent, or Firm* — IPUSA, PLLC

(57) ABSTRACT

An information processing system includes first information processing devices, and a second information processing device. Each of the first information processing devices includes a request transmitter for transmitting a connection request to the second information processing device; a first storage unit for storing job information to be executed by an apparatus; a retrieval unit for transmitting a request for job information to the second information processing device and receiving the job information; and a first reply unit for transmitting the job information to the apparatus. The second information processing device includes a collection unit for collecting the job information from each of the first storage units of the first information processing devices other than a source of a retrieval request; and a second reply unit for transmitting the job information to the source of the retrieval request.

16 Claims, 8 Drawing Sheets

INFORMATION PROCESSING SYSTEM AND INFORMATION PROCESSING METHOD FOR DISTRIBUTING JOB DATA AMONG PLURALITY OF FIRST INFORMATION PROCESSING DEVICES

BACKGROUND OF THE INVENTION

1. Field of the Invention

The present invention relates to an information processing system, an information processing device, an information processing method, and a program.

2. Description of the Related Art

A printing method has been known that is referred to as "pull-print printing" (cf. Patent Document 1 (Japanese Unexamined Patent Publication No. 2011-081741), for example). In the pull-print printing, a personal computer (PC) or the like may transmit print data to a predetermined server. The predetermined server stores the received print data. In response to an operation by a user to an image forming apparatus, the image forming apparatus may retrieve (pull) the print data that is stored in the server that is set, in advance, as a referent, and the image forming apparatus may execute a print job (a unit of a job to be executed by a computer). For the pull-print printing, situations can be prevented from occurring, such as a case in which a sheet on which confidential information is printed is left or confidential information is read by an unauthorized person, because the print job is executed when the user is in the vicinity of the image forming apparatus. Furthermore, according to the pull-print printing, a print job can be executed with respect to the same print data from each of a plurality of image forming apparatuses that refers to the same server.

However, in the pull-print printing, it may be difficult to share print data among image forming apparatuses that refer to different servers, respectively. For example, suppose that a user A stores print data in a server A that is a referent of image forming apparatuses that are located in the user A's office. In this case, the user A can cause each of the image forming apparatuses to execute the print job regarding the print data within the office. However, when the user A visit another office in which a referent of image forming apparatuses that are located in the other office is a server B, it may be difficult for the user A to cause each of the image forming apparatus that is located in the other office to process the print job that is stored in the server A.

There is a need for enhancing flexibility of distribution of data that is retrieved from a predetermined storage device by an apparatus as a job to be executed.

SUMMARY OF THE INVENTION

According to an aspect of the present invention, there is provided an information processing system including a plurality of first information processing devices, and a second information processing device, wherein each of the plurality of the first information processing devices is connected to a corresponding apparatus, and the second information processing device is connected to the plurality of the first information processing devices through a network. Each of the plurality of first information processing device includes a request transmitter configured to transmit, to the second information processing device, a connection request for establishing a communication connection with the second information processing device; a first storage unit configured to store first job information on a first job to be executed by the apparatus; a retrieval unit configured to transmit a retrieval request for retrieving second job information to the second information processing device, and configured to receive the second job information that is returned from the second information processing device; and a first reply unit configured to transmit, in response to a request from the apparatus corresponding to the first information processing device, the first job information that is stored in the first storage unit and the second job information that is retrieved by the retrieval unit to the apparatus. The second information processing device includes a collection unit configured to collect, in response to the retrieval request for retrieving the second job information, the first job information from each of the first storage units of a part of or all the plurality of the first information processing devices other than a source of the retrieval request, wherein the second information processing device establishes the communication connections with the part of or all the plurality of the first information processing devices other than the source of the retrieval request, in response to the connection requests from the part of or all the plurality of the first information processing devices other than the source of the retrieval request; and a second reply unit configured to transmit, to the first information processing device that is the source of the retrieval request, the first job information collected by the collection unit as the second job information.

According to another aspect of the present invention, there is provided an information processing method that is to be executed by a plurality of first information processing devices and a second information processing device, wherein each of the plurality of the first information processing devices is connected to a corresponding apparatus, and the second information processing device is connected to the plurality of the first information processing devices through a network. The method includes a request transmitting step, by each of the first information processing devices, of transmitting, to the second information processing device, a connection request for establishing a communication connection with the second information processing device; a storing step, by each of the first information processing devices, of storing first job information on a first job to be executed by the apparatus in a first storage unit; a retrieval step, by each of the first information processing devices, of transmitting a retrieval request for retrieving second job information to the second information processing device, and receiving the second job information that is transmitted from the second information processing device; a first reply step, by each of the first information processing devices, of transmitting, in response to a request from the apparatus corresponding to the first information processing device, the first job information that is stored in the first storage unit and the second job information that is retrieved by the retrieval step to the apparatus; a collection step, by the second information processing device, of collecting, in response to the retrieval request for retrieving the second job information, the first job information from each of the first storage units of a part of or all the plurality of the first information processing devices other than a source of the retrieval request, wherein the second information processing device establishes the communication connections with the part of or all the plurality of the first information processing devices other than the source of the retrieval request, in response to the connection requests from the part of or all the plurality of the first information processing devices other than the source of the retrieval request; and a second reply step, by the second information processing device, of transmitting, to the first information processing device that is the source of the retrieval request, the first job information collected by the collection step as the second job information.

According to an embodiment of the present invention, the flexibility of distribution can be enhanced for the data that is retrieved from the predetermined storage device by the apparatus as the job to be executed.

Other objects, features and advantages of the present invention will become more apparent from the following detailed description when read in conjunction with the accompanying drawings.

DETAILED DESCRIPTION OF THE PREFERRED EMBODIMENTS

Figure 1:
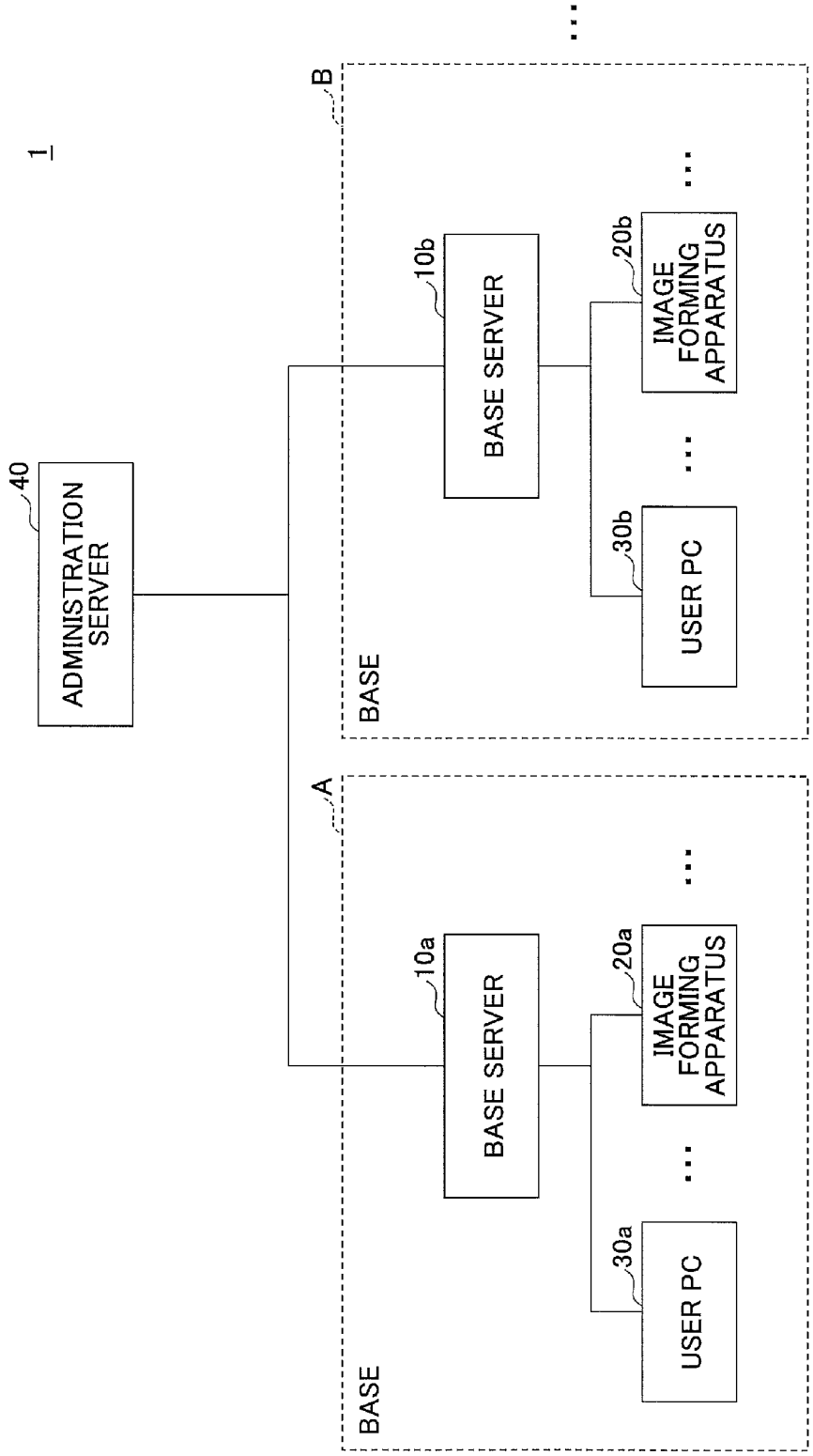
FIG. 1 is a diagram showing an example of a configuration of a printing system in an embodiment of the present invention.

Based on the accompanying drawings, an embodiment of the present invention is explained below. FIG. 1 is a diagram showing a configuration example of a printing system in the embodiment of the present invention.

In the printing system 1 that is shown in FIG. 1, each of bases, such as a base A or a base B, is a base of activities of a company, such as an office or a workplace. For example, the base A may be an office or a workplace in Japan, and the base B may be an office or a work place in the United States. There may be three or more bases. Here, "a" is attached to the end of each of the reference numerals of the devices that belong to the base A, and "b" is attached to the end of each of the reference numerals of the devices that belong to the base B. However, when the devices that belong to the base A and the devices that belong to the base B are not distinguished, "a" and "b" at the ends of the reference numerals may be omitted.

Each of the bases A and B may include a base server 10; one or more user's personal computers (PCs); and one or more image forming apparatuses 20. The base server 10, each of the user's PCs 30, and each of the image forming apparatuses 20 are connected through a network, such as a local area network (LAN) or the Internet, so that the base server 10, each of the user's PCs 30, and each of the image forming apparatus 20 can communicate with each other through the network. Namely, the base server 10a corresponds to the image forming apparatuses 20a, and the base server 10b corresponds to the image forming apparatuses 20b. Here, the image forming apparatuses 20a are different from the image forming apparatuses 20b.

Each of the user's PCs 30 is, for example, a personal computer (PC) that is used by a corresponding user who works at the office. In the embodiment, each of the user's PCs 30 may transmit job information of a print job (which is a unit of a job to be executed by a computer) to the base server 10 that belongs to the base that is the same as the base to which user's PC 30 belongs. Here, instead of the user's PC 30, a mobile phone, a smartphone, a tablet computer terminal, and so forth may be used.

The base server 10 is a computer that may receive job information that is transmitted from the user's PC 30, and that may store the job information. In the embodiment, one base server 10 is provided per base. However, a plurality of base servers 10 may be provided per base.

The image forming apparatus 20 may be an apparatus having a printing function, such as a multifunction peripheral or a printer. The image forming apparatus 20 may transmit a retrieval request for retrieving job information to the base server 10 that belongs to the same base as that of the image forming apparatus 20. The image forming apparatus 20 may execute a print job based on the returned job information.

Here, the base server 10 may store image data that is scanned by the image forming apparatus 20. In this case, the information that includes the image data and that is stored in the base server 10 may be retrieved from the image forming apparatus 20 as the job information.

An administration server 40 can be a computer that is connected to the plurality of the base servers 10 of the plurality of bases through a network, such as the Internet or a LAN, so that the administration server 40 can communicate with each of the base servers 10. The administration server 40 can enable job information to be distributed across the plurality of the base servers 10. Namely, the administration server 40 may enable the execution, by the image forming apparatus 20a of the base A, of a print job that is based on job information that is stored in the base server 10b of the base B, for example.

Here, the administration server 40 may not be unique to the printing system 1. For example, one administration server 40 may be provided per predetermined number of bases.

Figure 2:
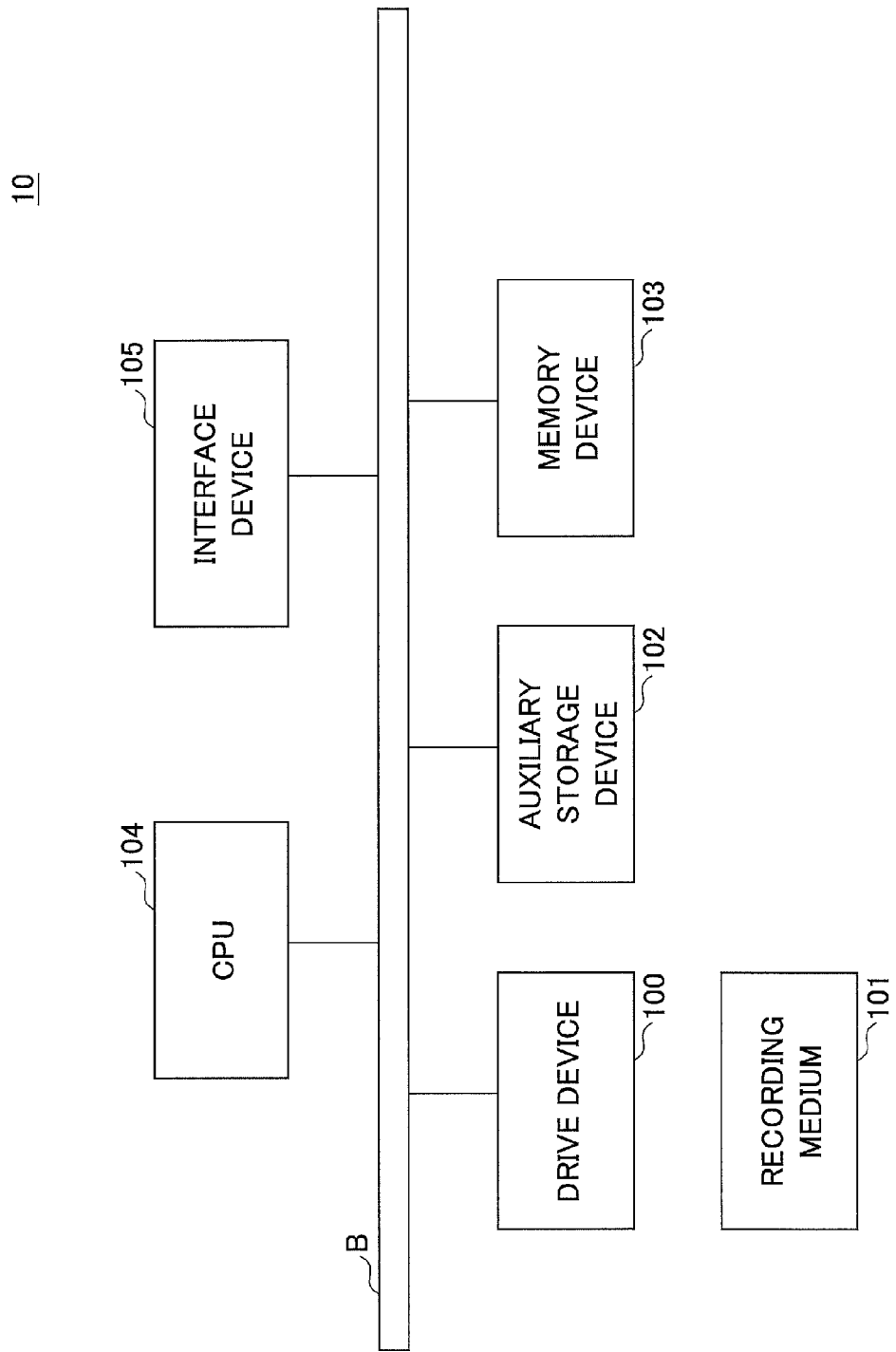
FIG. 2 is a diagram showing an example of a hardware configuration of a base server in the embodiment of the present invention.

FIG. 2 is a diagram showing a hardware configuration of the base server 10 in the embodiment of the present invention. The base server 10 of FIG. 2 may include a drive device 100; an auxiliary storage device 102; a memory device 103; a CPU 104; and an interface device 105. Here, the drive device 100, the auxiliary storage device 102, the memory device 103, the CPU 104, and the interface device 105 may be mutually connected through a bus B.

A program for executing the process at the base server 10 may be provided by a recording medium 101, such as a CD-ROM. When the recording medium 101 that stores the program is attached to the drive device 100, the program may be installed to the auxiliary storage device 102 through the drive device 100. Here, installation of the program may not be executed by using the recording medium 10. The program may be downloaded from another computer through a network. The auxiliary storage device 102 may store the installed program. At the same time, the auxiliary storage device 102 may store necessary files and data.

When a command to start execution of the program is received, the memory device 103 may read out the program from the auxiliary storage device 102, and the memory device 103 may store the program. The CPU 104 may execute functions of the base server 10 in accordance with the program that is stored in the memory device 103. The interface device 105 may be used as an interface for connecting the base server 10 to a network.

Here, each of the base servers 10 may be implemented as a plurality of computers, each of which has the configuration such as shown in FIG. 2. Additionally, the administration server 40 may have the hardware configuration similar to that of the base server 10.

Figure 3:
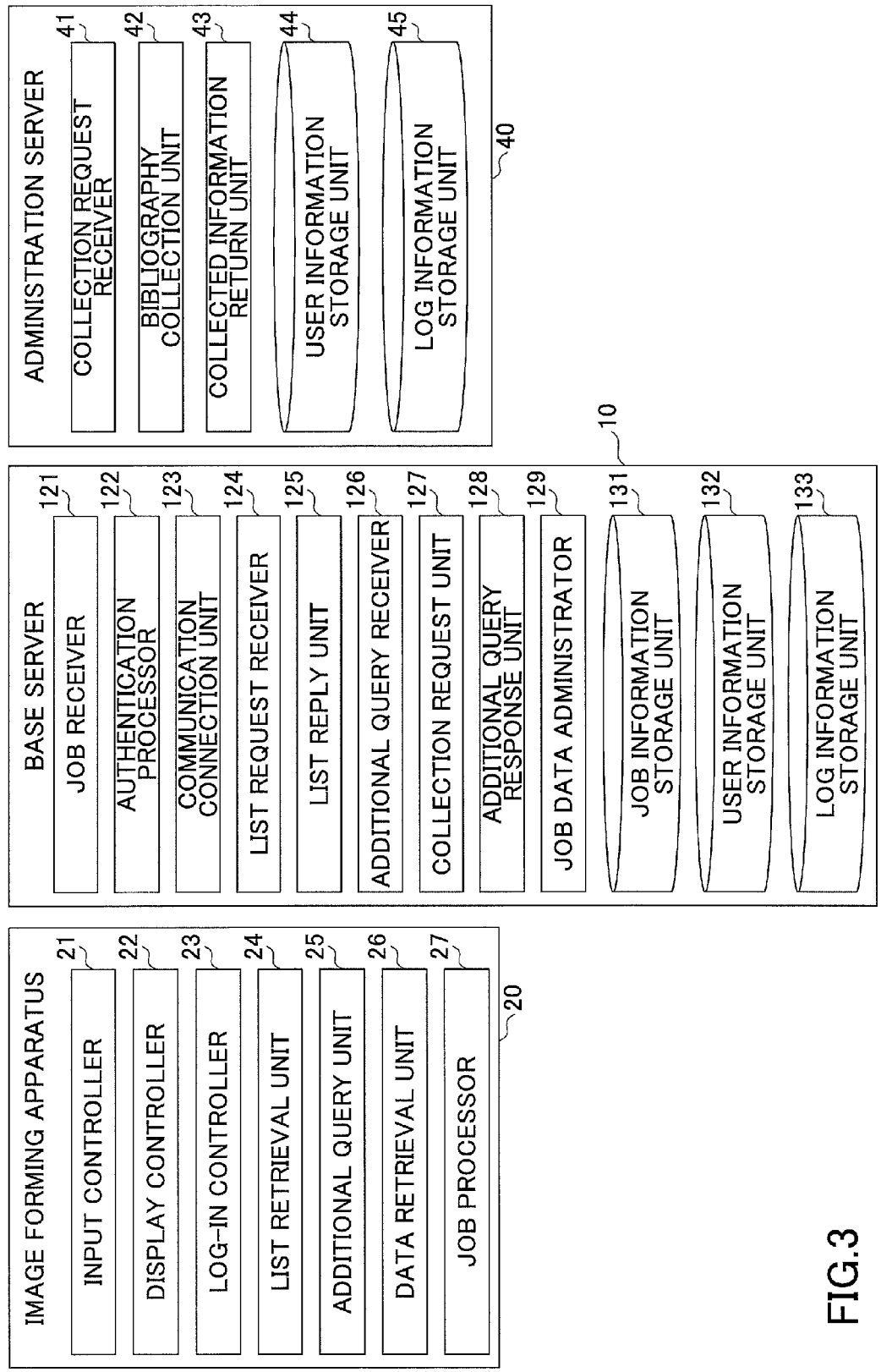
FIG. 3 is a diagram showing an example of a functional configuration of the printing system in the embodiment of the present invention.

FIG. 3 is a diagram showing an example of a functional configuration of the printing system in the embodiment of the present invention. In FIG. 3, the image forming apparatus 20 may include an input controller 21; a display controller 22; a log-in controller 23; a list retrieval unit 24; an additional query unit 25; a data retrieval unit 26; and a job processor 27, for example. Each of these units may be implemented by a process that is to be executed by the CPU of the image forming apparatus 20. Here, the program that is installed in the image forming apparatus 20 may cause the CPU to execute the process.

The input controller may parse a command input by a user through an operations panel included in the image forming apparatus 20, for example. The display controller 22 may cause information to be displayed on the operations panel. Here, the information is generated as a process that is executed by the image forming apparatus 20 proceeds. The log-in controller 23 may control a process of logging-in to the image forming apparatus 20 by a user.

The list retrieval unit 24 may query the base server 10 that is set as a referent of the image forming apparatus 20 for the job information that is stored in the base server 10. Namely, the list retrieval unit 24 may retrieve a bibliography information list of job information (which is referred to as "bibliography list," hereinafter) that is stored in the base server 10. In the embodiment, the job information may include the bibliography information and the job data. The bibliography information is the bibliography information of a document to be printed. The bibliography information may include identification information of a user (which is referred to as "user ID," hereinafter) that is a source of the request for printing, and a document name of a document to be printed. The job data may be data that can be utilized for rendering a print image during execution the print job, such as data in a page description language (PDL) format. In general, a data amount of the job data is greater than a data amount of the bibliography information.

The additional query unit 25 may transmit, to the referent base server 10, a query request for the job information that is stored in the base server 10 other than the referent base server 10 (which is referred to as "additional query request," hereinafter), and the additional query unit 25 may receive a bibliography list of the job information from the referent base server 10. The bibliography list that is received by the additional query unit 25 may be added to the bibliography list that is retrieved by the list retrieval unit 24, and the updated bibliography list may be displayed on the operations panel. Alternatively, the bibliography list that is retrieved by the list retrieval unit 24 may be replaced with the bibliography list that is received by the additional query unit 25, and the updated bibliography list may be displayed on the operations panel. Here, the bibliography list of the job information that is stored in the base server 10 that belongs to the base that is the same as that of the source of the additional query request may be included in a response to the additional query request.

The data retrieval unit 26 may retrieve (download) job data of the job information that corresponds to the bibliography information that is selected by a user from the bibliography list that is displayed on the operations panel. The bibliography information may include address information that indicates location information or a storage destination of the job data of the job information that corresponds to the bibliography information. In this embodiment, a uniform resource locator (URL) is utilized as an example of the address information. However, address information other than the URL may be utilized instead of the URL.

The job processor 27 may control printing of the job data that is retrieved by the data retrieval unit 26.

The base server 10 may include a job receiver 121; an authentication processor 122; a communication connection unit 123; a list request receiver 124; a list reply unit 125; an additional query receiver 126; a collection request unit 127; an additional query response unit 128; and a job data administrator 129, for example. Each of these unit may be implemented by a process that is executed by the CPU 104. Here, the program that is installed in the base server 10 may cause the CPU 104 to execute the process. The base server 10 may further include a job information storage unit 131, a user information storage unit 132, and a log information storage unit 133, for example. These storage units may be implemented by using the auxiliary storage device 102, for example. Alternatively, these storage units may be implemented by using a storage device that is connected to the base server 10 through a network.

The job receiver 121 may receive job information from the user's PC 30, for example. The job receiver 121 may store the received job information in the job information storage unit 131.

The authentication processor 122 may execute an authentication process for a user that attempts to log in to the image forming apparatus 20. In the authentication process, a determination is made as to whether authentication information that is transmitted from the information processing apparatus 20 matches information that is stored in the user information storage unit 132 for each of users. The authentication information may be a user ID and a password, for example. Alternatively, the authentication information may be a card ID or biometric information. The user information storage unit 132 may store user information. The user information may include information for which a determination is to be made, for each user, as to whether it matches the authentication information, and/or attribution information for each user.

The communication connection unit 123 may execute a process of connecting communication paths for receiving a request from the administration server 40. For example, if a firewall is provided for each of the bases, it may be difficult to cause a request from the administration server 40 to pass through the firewall, so that the request is received by the base server 10. That is because a request from outside may be blocked by the firewall. Accordingly, the communication connection unit 123 may ensure a pseudo communication path that enables reception of a request from the administration server 40. For example, the communication connection unit 123 may transmit a request for establishing a communication connection with the administration server 40, and the communication connection unit 123 may wait for a reply to the request. Namely, the administration server 40 may transmit, in the response to the request, a request from the administration server 40 to the base server 10. Here, the communication connection unit 123 may periodically transmit a request for establishing a communication connection with the administration server 40. For the case in which the request is periodically transmitted, the administration server 40 may ignore a request from the base server 10 when a request to the base server 10 is not included in the request from the base server 10.

A list request receiver 124 may receive a retrieval request for retrieving a bibliography list from the image forming apparatus 20. In response to the retrieval request for retrieving the bibliography list, the list reply unit 125 may return the bibliography list of the job information that is stored in the job information storage unit 131 of the base server 10.

The additional query receiver 126 may receive an additional query request from the image forming apparatus 20. In response to the additional query request, the collection request unit 127 may transmit, to the administration server 40, a correction request for collecting the bibliography information of the job information that is stored in another base server 10. The additional query response unit 128 may return, to the image forming apparatus 20 that is the source of the additional query request, the bibliography list of the job information that is stored in the other base server 10. Here, the bibliography list of the job information that is stored in the other base server 10 is returned from the administration server 40 in response to the collection request for collecting the bibliography information.

In response to the retrieval request for retrieving the job data from the image forming apparatus 20, the job data administrator 129 may retrieve, from the job information storage unit 131, the job data that is to be retrieved in response to the retrieval request, and the job data administrator 129 may return the job data to the image forming apparatus 20.

The log information storage unit 133 may store an access log for accessing from each of the image forming apparatuses 20 that belongs to the same base as that of the base server 10 to the base server 10. The access log may be generated per authentication request during logging in.

Alternatively, the access log may be generated for every request from the image forming apparatus 20. The access log may include a user ID that is identification information of an operator of the image forming apparatus 20.

The administration server 40 may include a collection request receiver 41; a bibliography collection unit 42; and a collected information return unit 43, for example. Each of these units may be implemented by a process that is executed by the administration server 40. Here, the program that is stored in the administration server 40 may cause the administration server 40 to execute the process. The administration server 40 may further include a user information storage unit 44 and a log information storage unit 45, for example. These storage units may be implemented, for example, by using the auxiliary storage device that is included in the administration server 40. Alternatively, these storage units may be implemented by using a storage device that is connected to the administration server 40 through a network.

The collection request receiver 41 may receive, from the base server 10, a collection request for collecting the bibliography information. In response to the collection request for collecting the bibliography information, the bibliography collection unit 42 may collect the bibliography information of the job information that is stored in the base server 10. The base server 10 as a collection destination, from which the bibliography information is collected, may be all the base servers 10, or it may be a part of or all the base servers 10 other than the source of the collection request. The collected information return unit 43 may return a list of the bibliography information (the bibliography list) that is collected by the bibliography collection unit 42 to the base server 10 that is the source of the collection request.

The user information storage unit 44 may store, for each of users in each of the bases, user information of the user. The user information storage unit 44 may store the original user information, and the user information storage unit 132 of each base server 10 may store a copy of the user information that is stored in the user information storage unit 44. Namely, the user information that is stored in the user information storage unit 44 may be copied to each of the user information storage units 132. When an authentication request is received at the base server 10, and when the user ID corresponding to the authentication request is not stored in the user information storage unit 132 of the base server 10, the user information may be copied. In this case, the user information storage unit 132 can serve as a cache of the user information storage unit 44. Alternatively, when the user information includes identification information of the base to which the user belongs (which is referred to as "base ID," hereinafter), the user information that is stored in the user information storage unit 44 may be distributed to the base servers 10 based on the base IDs. In this case, in the user information storage unit 132 of each of the base servers 10, the user information including the corresponding base ID of the base server 10 may be stored.

The log information storage unit 45 may store an access log that is uploaded from each of the base servers 10. Namely, each of the base servers 10 may upload the access log that is stored in the log information storage unit 133 of the base server 10 to the administration server 40. As a result, access logs of the all base servers 10 can be accumulated in the log information storage unit 133. Here, the access log that is uploaded to the administration server may include identification information of the base server 10 (which is referred to as "base server ID," hereinafter) that is the source of the uploaded access log.

Figure 4:
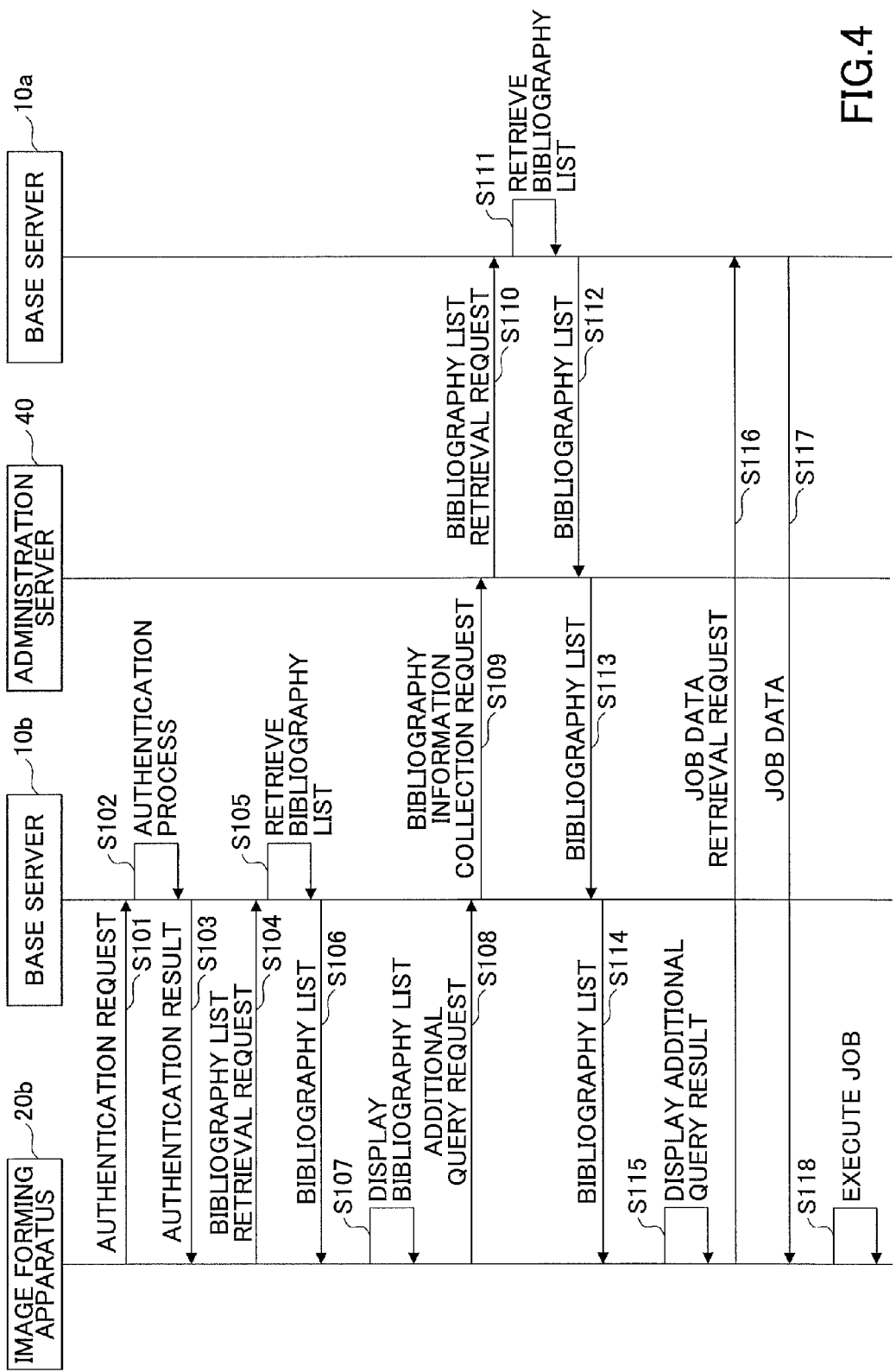
FIG. 4 is a sequence diagram for illustrating an example of a processing procedure that is to be executed in the printing system.

An example of a processing procedure to be executed by the printing system 1 is explained below. FIG. 4 is a sequence diagram illustrating the example of the processing procedure that is to be executed by the printing system 1. In FIG. 4, the image forming apparatus 20*b* of the base B is operated by a user L who belongs to the base A. Here, it is assumed that the user L is visiting the base B on business.

In an initial state of FIG. 4, a log-in screen is displayed on the operations panel of the image forming apparatus 20*b*. When the user L enters authentication information, such as a user ID and a password, through the log-in screen, the log-in controller 21 may transmit an authentication request including the authentication information to the base server 10*b* that is the referent (S101).

The authentication processor 122 of the base server 10*b* may execute an authentication process (S102) by making a determination as to whether the authentication information included in the authentication request matches the user information that is stored in the user information storage unit 132 of the base server 10*b*. Here, when the user information that matches the authentication information is not stored in the user information storage unit 132, the authentication processor 122 may retrieve the user information including the information that matches the authentication information from the user information storage unit 44 of the administration server 40, and the authentication processor 122 may store the user information in the user information storage unit 132. Namely, the authentication can be successfully made if the user information that matches the authentication information is stored in the user information storage unit 132 of the base server 10*b* or in the user information storage unit 44 of the administration server 40.

Subsequently, the authentication processor 122 may return, to the image forming apparatus 20*b*, an authentication result including information indicating as to whether the authentication is successful (S103). The authentication result may include the user ID of the user who has been authenticated. By doing this, when the authentication information is the card ID or the biometric information, the image forming apparatus 20*b* may recognize the user ID of the user who is attempting to log in to the image forming apparatus 20*b*.

When the authentication result indicates that the authentication is successful, the log-in controller 23 may store the user ID of the authenticated user L (which is referred to as "log-in user ID," hereinafter) in a memory. Additionally, the log-in controller 23 may delete the log-in screen. As a result, the user L may be allowed to operate an operation menu that is displayed on the operations panel.

Subsequently, the list retrieval unit 24 of the image forming apparatus 20b may assign the log-in user ID to a retrieval request and transmit the retrieval request including the log-in user ID, which is for retrieving the bibliography list to the base server 10b (S104). The list request receiver 124 of the base server 10b may receive the retrieval request. Subsequently, the list reply unit 125 of the base server 10b may retrieve, among the bibliography information of the job information that is stored in the job information storage unit 131 of the base server 10b, the bibliography information that satisfies a predetermined condition (S105). As an example of the predetermined condition, a condition can be considered such that the bibliography information includes the user ID that is assigned to the retrieval request for retrieving the bibliography list or the bibliography information is associated with the user ID. Namely, the fact that the job information of the print job has been input by the user L can be an example of the predetermined condition. Alternatively, when the rights management is executed, the predetermined condition may be such that the bibliography information corresponds to the job information for which the user L has the right to print. It can be determined based on the parameters included in the bibliography information as to whether the user L has the right to print. Additionally, when the status management is executed for the job information, the fact that the printing has not been executed in the past for the job information may be added to the predetermined condition.

Subsequently, the list reply unit 125 of the base server 10b may return the list of the retrieved bibliography information (the bibliography list) to the image forming apparatus 20b that is the source of the retrieval request for retrieving the bibliography list (S106). The list retrieval unit 24 of the image forming apparatus 20 may receive the returned bibliography list.

Subsequently, the display controller 22 of the image forming apparatus 20b may cause the operation panel of the image forming apparatus 20b to display a bibliography list display screen (S107). Here, the display screen includes the received bibliography list.

Figure 5:
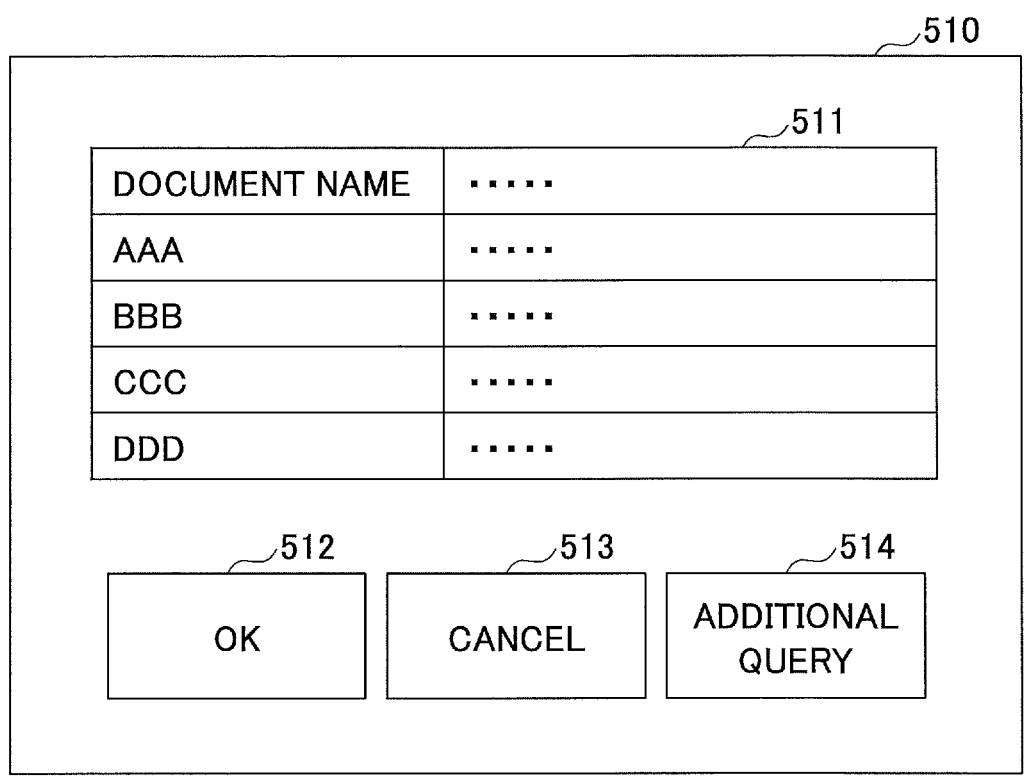
FIG. 5 is a diagram showing a display example of a bibliography list display screen.

FIG. 5 is a diagram showing a display example of the bibliography list display screen. In FIG. 5, the display screen for displaying the bibliography list 510 may include a bibliography list display area 511; an OK button 512; a cancel button 513; and an additional query button 514, for example.

The bibliography list display area 511 may be a list such that each of rows is filled with a corresponding item of the bibliography information that is included in the received bibliography list. The OK button 512 may be a button for receiving an execution instruction for executing the print job that corresponds to one or more items of the bibliography information that are selected in the bibliography list display area 511. The cancel button 513 may be a button for receiving a cancellation instruction for cancelling the previous operation. The additional query button 514 may be a button for receiving an instruction for additional querying.

Here, it is assumed that the user L, who is the operator of the image forming apparatus 20b, is usually doing business at the base A. Accordingly, the print job that is input by the user L by using the user's PC 30 at the base A may be stored in the base server 10a of the base A. There is no bibliography information that is to be displayed on the bibliography list display area 511, provided that the user L has not input the print job to the user's PC 30 at the base B.

The user L may press the additional query button 514 when the bibliography information of a desired print job is not displayed. In response to pressing the additional query button 514, the additional query unit 25 of the image forming apparatus 20b may assign the log-in user ID to an additional query request and transmit the additional query request including the log-in user ID to the base server 10b (S108). The additional query receiver 126 of the base server 10b may receive the additional query request. With a configuration such that step S108 and subsequent steps are to be executed when the additional query button 514 is pressed, a communication traffic volume can be reduced compared to a case in which steps S109 to S113 (which are described below) are always executed.

The collection request unit 127 of the base server 10b may transmit a collection request for collecting the bibliography information to the administration server 40 (S109). The user ID that is assigned to the additional query request is assigned to the collection request. The bibliography collection unit 42 of the administration server 40 may transmit a retrieval request for retrieving the bibliography list to each of the base servers 10 (S110). The user ID that is assigned to the collection request is assigned to the retrieval request. Here, the retrieval request may be transmitted to each of the base servers 10 while the retrieval request is included in a response to a connection request for establishing a communication connection that is transmitted from the communication connection unit 123 of the base server 10. By doing this, even if a firewall is provided for each of the bases, the retrieval request can be received at each of the base servers 10.

In FIG. 4, the retrieval request for retrieving the bibliography list is transmitted to the base server 10a. However, the retrieval request can be transmitted to each of the base servers 10. However, the base server 10b may be excluded from the destinations of the retrieval request. Alternatively or additionally, the base server 10 that is usually used by the user L may be determined based on the information indicating the correspondences between the users and the base servers 10, and the destination of the retrieval request may be limited to the base server 10 that is usually used by the user L. By limiting the destination of the retrieval request for retrieving the bibliography list, it can be expected that the load on the network can be reduced, and that the response characteristics with respect to the retrieval request for retrieving the bibliography list can be enhanced.

As an example of the information indicating the correspondences between the users and the base station servers 10, the user information that is stored in the user information storage unit 44 can be considered. Namely, the user information may include the base server ID of the base server 10 that is usually used by the user. In this case, the determination of the base server 10 that is usually used by, the user L may be made by the collection request unit 127 of the base server 10b. That is because, during the authentication of the user L, the user information of the user L is downloaded to the user information storage unit 132 of the base server 10b, and based on the user information, a determination can be made that the base server 10 that is usually used by the user L is the base server 10a. Based on the determination result, the collection request unit 127 may assign the information indicating the base server 10a together with the user ID of the user L to the collection request for collecting the bibliography information to the administration server 40. In this case, the bibliography collection unit 42 of the administration server 40 may limit the destination of the retrieval request for retrieving the bibliography list to the base server 10*a* that is indicated by the information assigned to the collection request for collecting the bibliography information. Here, the base server 10 that is usually used by the user may not be limited to a single base server 10. Namely, the user information may include a plurality of base server IDs.

As another example that indicates the correspondences between the users and the base servers 10, the access logs that are stored in the log information storage unit 45 can be considered. Each of the access logs that is stored in the log information storage unit 45 includes a user ID and a base server ID. Accordingly, the access logs can be classified for each user ID. Then, a determination can be made that the base server 10 that corresponds to the base server ID that is most commonly included in the access log group is the base server 10 that is usually used by the user L. Here, the base server 10 that corresponds to the base server ID such that the number of times that the base server ID is included in the access log group for the user L is within N-th in descending order, or the number of times that the base server ID is included in the access log group for the user L is greater than or equal to a predetermined number may be selected as the destination of the retrieval request for retrieving the bibliography list.

The list reply unit 125 of, for example, the base server 10*a* that receives the retrieval request for retrieving the bibliography list may retrieve, among the bibliography information of the job information that is stored in the job information storage unit 131 of the base server 10, bibliography information that satisfies a predetermined condition (S111). Here, the predetermined condition may be the same as the predetermined condition at step S105. Subsequently, the list reply unit 125 of the base server 10*a* may transmit (return) the retrieved bibliography list to the administration server 40 (S112). The bibliography collection unit 42 of the administration server 40 may receive the returned bibliography list.

When the bibliography list is returned from each of the base servers 10 that is the destination of the retrieval request for retrieving the bibliography list, the collected information return unit 43 of the administration server 40 may transmit a bibliography list that is a result of combining the bibliography lists from the corresponding base servers 10 to the base server 10*b* that is the source of the collection request (S113). The additional query response unit 128 of the base server 10*b* may return the returned bibliography list to the image forming apparatus 20*b* that is the source of the additional query request (S114). The additional query unit 25 of the image forming apparatus 20*b* may receive the returned bibliography list.

The display controller 22 of the image forming apparatus 20*b* may cause the operations panel of the image forming apparatus 20*b* to display an additional query result screen that includes the received bibliography list (S115). The configuration of the additional query result screen may be the same as that of the bibliography list display screen that is shown in FIG. 5. However, the additional query result screen may not include the additional query button 514. Alternatively, in the additional query result screen, the additional query button 514 may be grayed out.

When, in the additional query result screen, one or more items of the bibliography information is selected by the user L and an execution instruction for executing the job is input, the data retrieval unit 26 of the image forming apparatus 20*b* may transmit a retrieval request for retrieving job data to the URL that is included in the selected item of the bibliography information (S116). In this example, the retrieval request is transmitted to the base server 10*a*. Here, the job data may not be stored in the base server together with the bibliography information. For example, the job data may be stored in the user's PC 30 that is the source of inputting the print job. In this case, in the bibliography information corresponding to the print job, a URL may be included that indicates the location in the user PC 30 at which the job data is stored. Accordingly, in this case, the retrieval request for retrieving the job data is transmitted to the user's PC 30.

The job data administrator 129 of the base server 10*a* may retrieve, from the job information storage unit 131, the job data that is identified by the URL that is the destination of the retrieval request for retrieving the job data, and the job data administrator 129 may return the job data (S117). The job processor 27 of the image forming apparatus 20*b* may cause the image forming apparatus 20*b* to execute printing of the job data (S118). As a result, the print job corresponding to the job information that is stored in the base server 10*a* can be executed by the image forming apparatus 20*b* that belongs to the base B.

Note that, in FIG. 4, steps S106 to S108 may be omitted. Namely, subsequent to step S105, step S109 and subsequent steps may be automatically executed. However, in this case, steps S109 to S113 are to be executed, even if the user L is staying at the base A and desires to print the job information that is stored in the base server 10*a*. Namely, unnecessary communication is to be executed. Thus, the collection request unit 127 of the base server 10*b* may be configured such that the collection request unit 127 automatically executes step S109, only if it is possible that the image forming apparatus 20*b* that is the source of the retrieval request for retrieving the bibliography information at step S104 is operated by a user who usually does not utilize the base server 10*b*.

The possibility that the image forming apparatus 20*b* is operated by the user who usually does not utilize the base server 10*b* may be estimated, for example, from the fact that none of the job information that satisfies the predetermined condition at step S105 is stored in the job information storage unit 131.

Alternatively or additionally, the possibility that the image forming apparatus 20*b* is operated by the user who usually do not utilize the base server 10*b* may be estimated by the fact that a number of access logs, among the group of the access logs that is stored in the log information storage unit 133 of the base server 10*b*, that include the user ID that is assigned to the retrieval request for retrieving the bibliography list is zero, or it is less than or equal to a predetermined number.

Alternatively or additionally, the possibility that the image forming apparatus 20*b* is operated by the user who usually do not utilize the base server 10*b* may be estimated if it is found, during the authentication process at step S102, that the user information is not stored in the user information storage unit 132 of the base server 10*b* and the user information is stored in the user information storage unit 44 of the administration server 40.

Hereinafter, there are explained examples of processing procedures that are to be executed by the image forming apparatus 20, the base server 10, and the administration server 40, respectively. These processing procedures correspond to the processing procedure that is explained by referring to FIG. 4.

Figure 6:
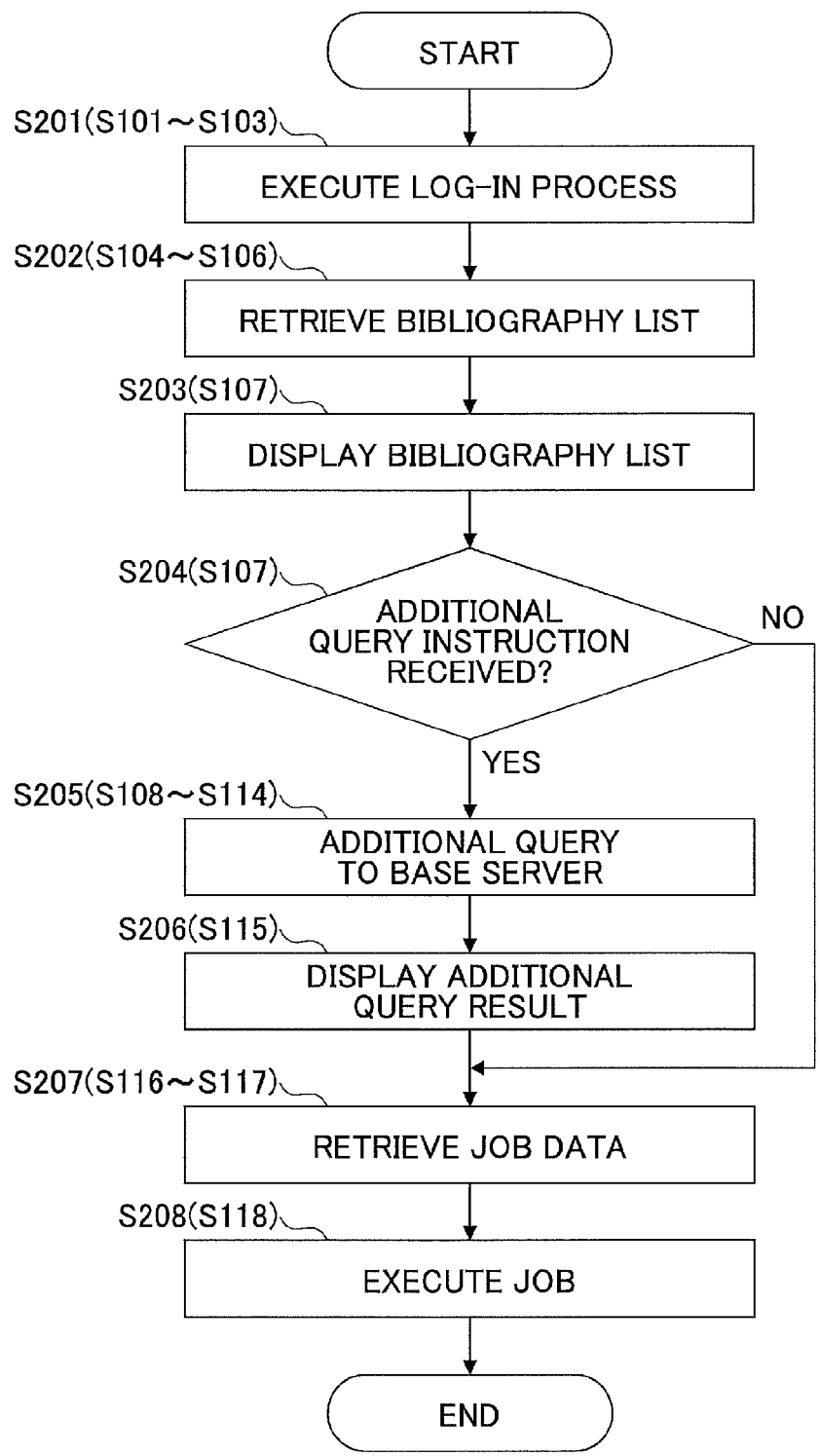
FIG. 6 is a flowchart illustrating an example of a processing procedure that is to be executed by the image forming apparatus.

FIG. 6 is a flowchart illustrating the example of the processing procedure to be executed by the image forming apparatus 20. In FIG. 6, each step number in parentheses that is attached to each step is the step number of the step in FIG. 4 that corresponds to the step in FIG. 6.

At step S201, the log-in controller 23 may execute a log-in process. When the log-in is successful, the list retrieval unit

24 may retrieve the bibliography list from the base server 10 that corresponds to the image forming apparatus 20 (S202). The base server 10 that corresponds to the image forming apparatus 20 may be the base server 10 that has been set as a referent of the image forming apparatus 20, for example.

Subsequently, the display controller 22 may cause the operations panel to display the bibliography list display screen 510 that includes the retrieved bibliography list (S203). When the user presses the additional query button 514 (S204: Yes), the additional query unit 25 may make an additional query to the corresponding base server 10 (S205). Subsequently, the display controller 22 may cause the operations panel to display the additional query result screen that includes the bibliography list as a result of the additional query (S206). Note that, in the bibliography list display screen 510, when one or more items of the bibliography information are selected and the OK button 512 is pressed, steps S205 and S206 are not to be executed.

Subsequently, the data retrieval unit 26 may retrieve the job data based on the URL that is included in the bibliography information that is selected in the bibliography list display screen 510 or in the additional query result screen (S207). The job processor 27 may execute the print job for the retrieved job data (S208).

Figure 7:
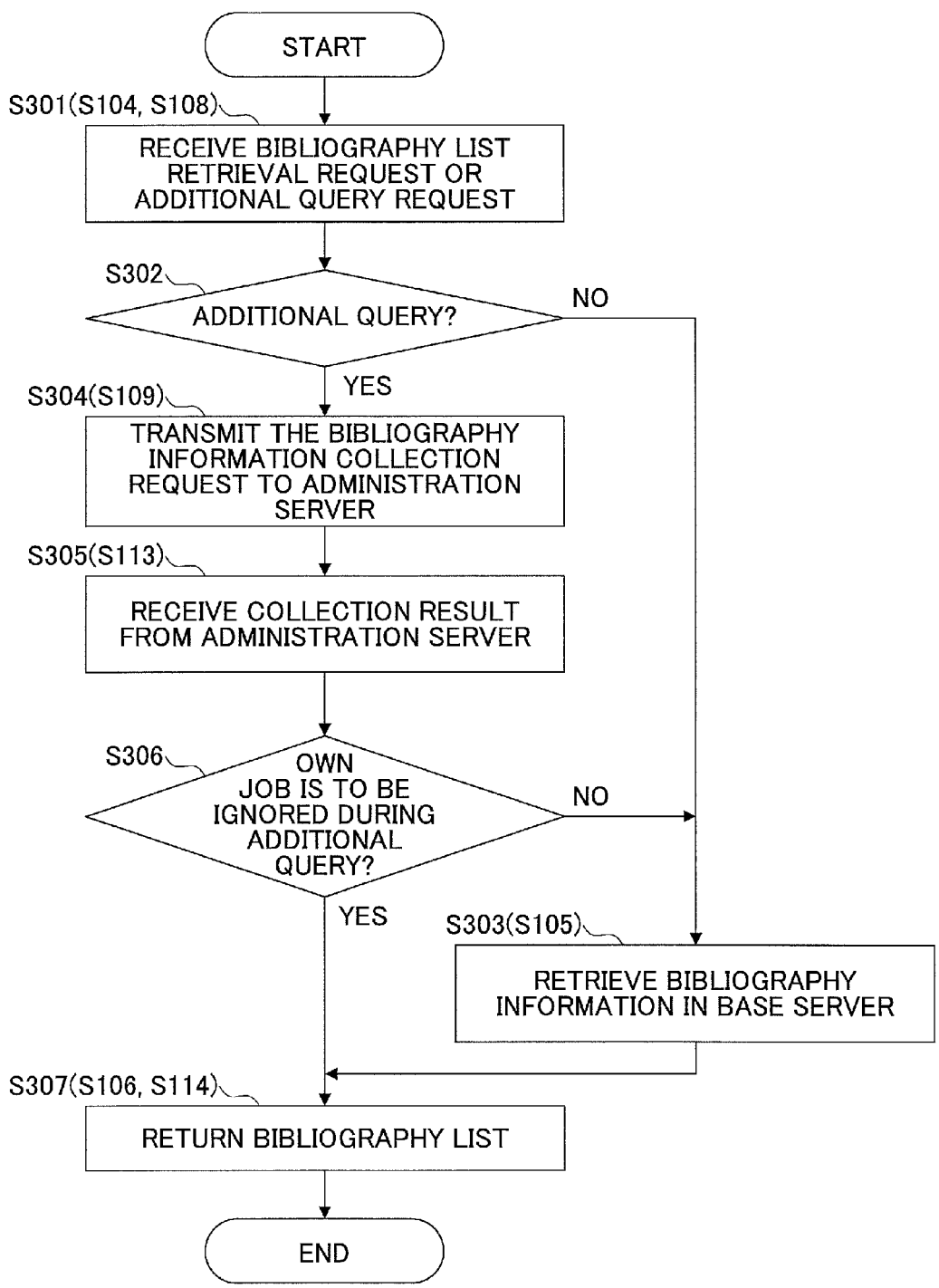
FIG. 7 is a flowchart illustrating an example of a processing procedure that is to be executed by the base server.

FIG. 7 is a flowchart illustrating the example of the processing procedure that is to be executed by the base server 10. In FIG. 7, each step number in parentheses that is attached to each step is the step number of the step in FIG. 4 that corresponds to the step in FIG. 7.

At step S301, the list request receiver 124 or the additional query receiver 126 may receive a retrieval request for retrieving the bibliography list or the additional query request from the image forming apparatus 20. When the received request is the retrieval request for retrieving the bibliography list (S302: No), the list reply unit 125 may retrieve the bibliography list that satisfies a predetermined condition from the job information storage unit 131 of the base server 10 (S303).

When the received request is the additional query request (S302: Yes), the collection request unit 127 may transmit a collection request for collecting the bibliography information to the administration server 40 (S304). Subsequently, the collection request unit 127 may receive the bibliography list that is returned from the administration server 40 (S305). Subsequently, the collection request unit 127 may determine as to whether information indicating that the own job is to be ignored during an additional query is set in the base server 10 (S306). The own job may be the job information that is stored in the job information storage unit 131 of the base server 10. When the information indicating that the own job is not to be ignored is set (S306: No), the collection request unit 127 may retrieve the bibliography list that satisfies a predetermined condition from the job information storage unit 131 of the base server 10 (S303).

For the case of "Yes" at step S306 or subsequent to step S305, the list reply unit 125 or the additional query response unit 128 may return the retrieved bibliography list to the image forming apparatus 20 (S307).

Figure 8:
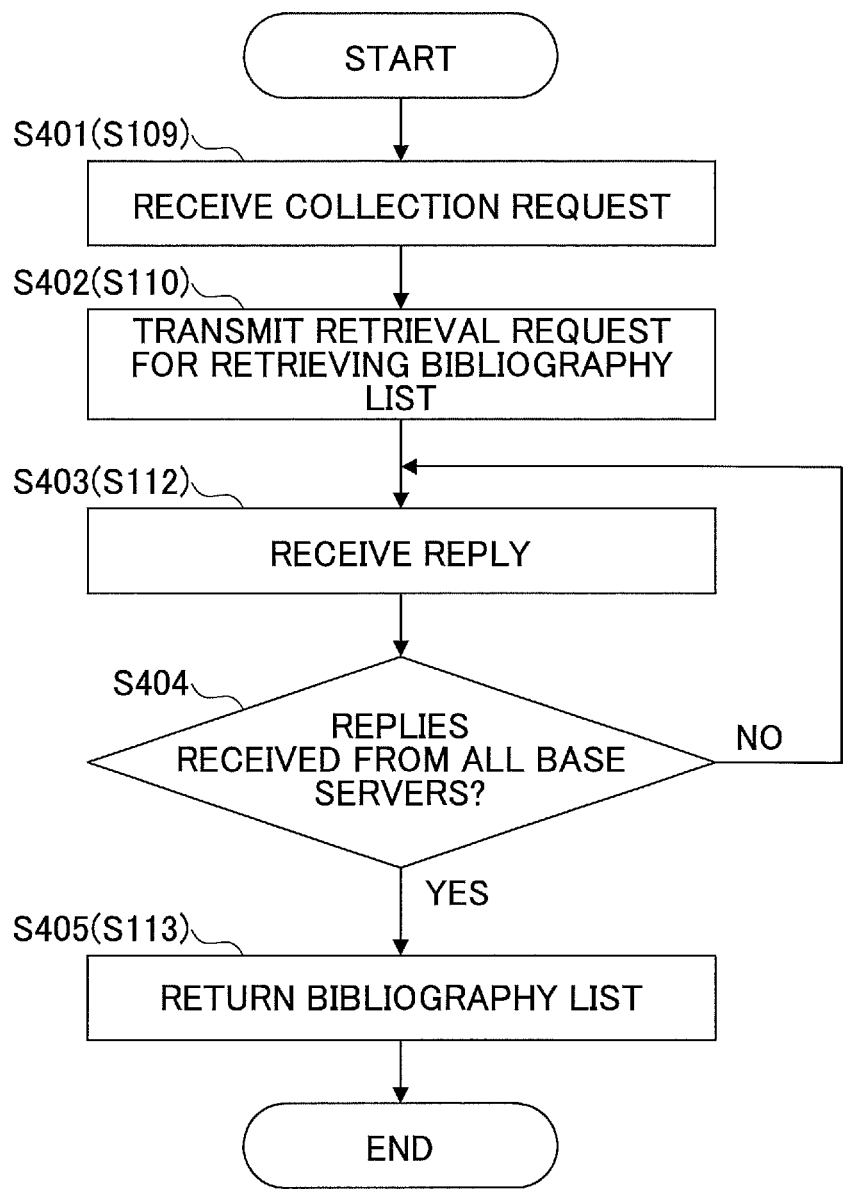
FIG. 8 is a flowchart illustrating an example of a processing procedure that is to be executed by an administration server.

FIG. 8 is a flowchart illustrating the example of the processing procedure that is to be executed by the administration server 40. In FIG. 8, each step number in parentheses that is attached to each step is the step number of the step in FIG. 4 that corresponds to the step in FIG. 8.

At step S401, the collection request receiver 41 may receive a collection request for collecting the bibliography information. Subsequently, the bibliography collection unit 42 may transmit a retrieval request for retrieving the bibliography list to a part of or all the base servers 10 (S402). The retrieval request may be included in a response to a connection request for establishing a communication connection, which is transmitted from the communication connection unit 123 of each of the base servers 10, and transmitted to each of the base servers 10.

Subsequently, the bibliography collection unit 42 may receive the bibliography list that is returned (transmitted) from each of the base servers that is the destination of the retrieval request (S403). After the bibliography lists are received from all the base servers 10 that are the destinations of the retrieval requests (S404: Yes), a mode of waiting for the returned bibliography lists is released. Note that, the mode of waiting for the returned bibliography lists may be released as the mode becomes time-out.

Subsequently, the collected information return unit 43 may return the bibliography lists that are returned from the corresponding base servers 10 to the base server 10 that is the source of the collection request (S405).

As described above, according to the embodiment, the bibliography information can be distributed across the base servers 10 by using the administration server 40 as a relay point. Therefore, a user can utilize the pull-print printing across bases. Namely, it is possible to enhance the flexibility of distribution of the job information that is stored in the base server 10.

Additionally, by using the administration server 40 as the relay point, a communication traffic volume can be reduced compared to a case in which the base servers 10 mutually exchange the bibliography information, for example.

Further more, the communication traffic volume for the whole printing system 1 can be reduced because the job data may not be included in the information that is distributed while using the administration server 40 as the relay point. However, the job information including the job data may be distributed instead of the bibliography information. In this case, steps S116 and S117 in FIG. 4 may not be required.

In the embodiment, a print job is explained as an example of a job to be executed by a device. However, the embodiment may be applied to another type of a job, provided that the job can be stored in the storage device, and a device can retrieve the job from the storage device and execute the retrieved job. Accordingly, the embodiment may be applied to a device, other than the image forming apparatus 20, that can execute the other type of the job. For example, the embodiment may be applied to a system such that job information including image data that is to be projected by a projector may be stored in a storage device, and the projector may retrieve the job information from the storage device and project the retrieved image data.

In the embodiment, the base server 10 is an example of a first information processing device. The administration server is an example of a second information processing device. The printing system 1 is an example of an information processing system. The communication connection unit 123 is an example of a request transmitter. The job information storage unit 131 is an example of a first storage unit. The collection request unit 127 is an example of a retrieval unit. The list reply unit 125 and the additional query response unit 128 are an example of a first reply unit. The bibliography collection unit 42 is an example of a collection unit. The collection unit 43 is an example of a second reply unit. The retrieval request for retrieving the bibliography list at step S104 is an example of a first request. The additional query request at step S108 is an example of a second request. The user ID is an example of user identification information. The user information storage unit 132, the log information storage unit 133, the user information storage unit 44, and the log information storage unit 45 are an example of a second storage unit.

The information processing system and the information processing method are explained above by the embodiment. However, the present invention is not limited to the above-described embodiment, and various variations and modifications may be made without departing from the scope of the claims.

The present invention can be implemented in any convenient form, for example using dedicated hardware, or a mixture of dedicated hardware and software. The present invention may be implemented as computer software implemented by one or more network processing apparatuses. The network can comprise any conventional terrestrial or wireless communications network, such as the Internet. The processing apparatuses can comprise any suitable programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device. The hardware platform includes any desired hardware resources including, for example, a central processing unit (CPU), a random access memory (RAM), and a hard disk drive (HDD). The CPU may be implemented by any desired type of any desired number of processor. The RAM may be implemented by any desired type of volatile or non-volatile memory. The HDD may be implemented by any desired type of non-volatile memory capable of storing a large amount of data. The hardware resources may additionally include an input device, an output device, or a network device, depending on the type of the apparatus. Alternatively, the HDD may be provided outside the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Application No. 2014-004091 filed on Jan. 14, 2014, the entire contents of which are hereby incorporated herein by reference.

What is claimed is:

1. An information processing system comprising: a plurality of first information processing devices, and a second information processing device, wherein each of the plurality of the first information processing devices is connected to a corresponding apparatus, and the second information processing device is connected to the plurality of the first information processing devices through a network, wherein each of the plurality of first information processing device includes:

a request transmitter configured to transmit, to the second information processing device, a connection request for establishing a communication connection with the second information processing device;

a first storage unit configured to store first job information on a first job to be executed by the apparatus;

a retrieval unit configured to transmit a retrieval request for retrieving second job information to the second information processing device, and configured to receive the second job information that is transmitted from the second information processing device; and a first reply unit configured to transmit, in response to a request from the apparatus corresponding to the first information processing device, the first job information that is stored in the first storage unit and the second job information that is retrieved by the retrieval unit to the apparatus; and wherein the second information processing device includes:

a collection unit configured to collect, in response to the retrieval request for retrieving the second job information, the first job information from each of the first storage units of a part of or all the plurality of the first information processing devices other than a source of the retrieval request, wherein the second information processing device establishes the communication connections with the part of or all the plurality of the first information processing devices other than the source of the retrieval request, in response to the connection requests from the part of or all the plurality of the first information processing devices other than the source of the retrieval request; and a second reply unit configured to transmit, to the first information processing device that is the source of the retrieval request, the first job information collected by the collection unit as the second job information.

2. The information processing system according to claim 1, wherein the first reply unit is configured to transmit, in response to a first request from the apparatus that corresponds to the first information processing device, the first job information that is stored in the first storage unit to the apparatus, and wherein the retrieval unit is configured to transmit, in response to a second request from the apparatus to which the first job information is transmitted from the first reply unit, the retrieval request for retrieving the second job information to the second information processing device, and configured to receive the second job information that is transmitted from the second information processing device.

3. The information processing system according to claim 2, wherein the second request is transmitted from the apparatus, in response to an operation by the user with respect to the apparatus that displays the first job information that is transmitted to the apparatus in response to the first request.

4. The information processing system according to claim 1, wherein the retrieval unit is configured to transmit, when the first storage unit does not store the first job information on the first job that satisfies a predetermined condition, the retrieval request for retrieving the second job information on a second job that satisfies the predetermined condition to the second information processing device.

5. The information processing system according to claim 1, wherein the first reply unit is configured to transmit the first job information that is stored in the first storage unit and the second job information that is retrieved by the retrieval unit to the apparatus, wherein each of the first job information and the second job information is associated with user identification information that is specified by the request from the apparatus.

6. The information processing system according to claim 5, wherein, when the retrieval unit determines, based on correspondence information that indicates correspondence between user identification information items and the first information processing device that is stored in a second storage unit, that the user identification information that is specified by the request from the apparatus does not correspond to the first information processing device, the retrieval unit is configured to transmit the retrieval request for retrieving the second job information to the second information processing device, and configured to receive the second job information that is transmitted from the second information processing device.

7. The information processing system according to claim 6, wherein the retrieval unit is configured to assign, to the retrieval request, device information that indicates the first information processing device that is determined to correspond to the user identification information based on the user identification information that is specified by the request from the apparatus or the correspondence information that is stored in the second storage unit, and
wherein the collection unit is configured to limit information to be collected to the first job information that is stored in the first storage unit of the first information processing device that is determined to correspond to the user identification information that is specified by the retrieval request based on the correspondence information that is stored in the second storage unit, or the first job information that is stored in the first storage unit of the first information processing device that is indicated by the device information that is specified by the retrieval request.

8. The information processing system according to claim 6, wherein the second storage unit is configured to store a log of the user identification information that is included in the request from the apparatus.

9. An information processing method that is to be executed by a plurality of first information processing devices and a second information processing device, wherein each of the plurality of the first information processing devices is connected to a corresponding apparatus, and the second information processing device is connected to the plurality of the first information processing devices through a network, the method comprising:
a request transmitting step, by each of the first information processing devices, of transmitting, to the second information processing device, a connection request for establishing a communication connection with the second information processing device;
a storing step, by each of the first information processing devices, of storing first job information on a first job to be executed by the apparatus in a first storage unit;
a retrieval step, by each of the first information processing devices, of transmitting a retrieval request for retrieving second job information to the second information processing device, and receiving the second job information that is transmitted from the second information processing device;
a first reply step, by each of the first information processing devices, of transmitting, in response to a request from the apparatus corresponding to the first information processing device, the first job information that is stored in the first storage unit and the second job information that is retrieved by the retrieval step to the apparatus;
a collection step, by the second information processing device, of collecting, in response to the retrieval request for retrieving the second job information, the first job information from each of the first storage units of a part of or all the plurality of the first information processing devices other than a source of the retrieval request, wherein the second information processing device establishes the communication connections with the part of or all the plurality of the first information processing devices other than the source of the retrieval request, in response to the connection requests from the part of or all the plurality of the first information processing devices other than the source of the retrieval request; and
a second reply step, by the second information processing device, of transmitting, to the first information processing device that is the source of the retrieval request, the first job information collected by the collection step as the second job information.

10. The information processing method according to claim 9,
wherein the first reply step transmits, in response to a first request from the apparatus that corresponds to the first information processing device, the first job information that is stored in the first storage unit to the apparatus, and
wherein the retrieval step transmits, in response to a second request from the apparatus to which the first job information is transmitted in the first reply step, the retrieval request for retrieving the second job information to the second information processing device, and receives the second job information that is transmitted from the second information processing device.

11. The information processing method according to claim 10,
wherein the second request is transmitted from the apparatus, in response to an operation by the user with respect to the apparatus that displays the first job information that is transmitted to the apparatus in response to the first request.

12. The information processing method according to claim 9,
wherein the retrieval step transmits, when the first storage unit does not store the first job information on the first job that satisfies a predetermined condition, the retrieval request for retrieving the second job information on a second job that satisfies the predetermined condition to the second information processing device.

13. The information processing method according to claim 9,
wherein the first reply step transmits the first job information that is stored in the first storage unit and the second job information that is retrieved by the retrieval step to the apparatus, wherein each of the first job information and the second job information is associated with user identification information that is specified by the request from the apparatus.

14. The information processing method according to claim 13,
wherein, when the retrieval step determines, based on correspondence information that indicates correspondence between user identification information items and the first information processing device that is stored in a second storage unit, that the user identification information that is specified by the request from the apparatus does not correspond to the first information processing device, the retrieval step transmits the retrieval request for retrieving the second job information to the second information processing device, and receives the second job information that is transmitted from the second information processing device.

15. The information processing method according to claim 14,
wherein the retrieval step assigns, to the retrieval request, device information that indicates the first information processing device that is determined to correspond to the user identification information based on the user identification information that is specified by the request from the apparatus or the correspondence information that is stored in the second storage unit, and wherein the collection step limits information to be collected to the first job information that is stored in the first storage unit of the first information processing device that is determined to correspond to the user identification information that is specified by the retrieval request based on the correspondence information that is stored in the second storage unit, or the first job information that is stored in the first storage unit of the first information processing device that is indicated by the device information that is specified by the retrieval request.

16. The information processing method according to claim 14, wherein the second storage unit stores a log of the user identification information that is included in the request from the apparatus.

* * * * *